Jan. 3, 1950 A. W. MACKIE 2,493,004
VEHICLE SUSPENSION
Filed Aug. 27, 1945 3 Sheets-Sheet 1
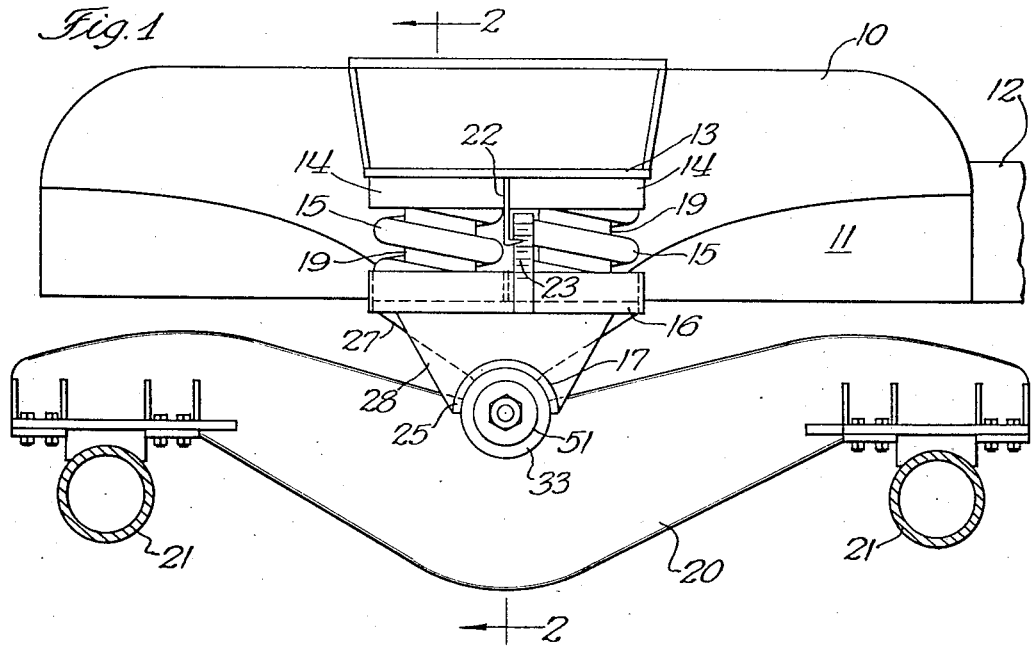
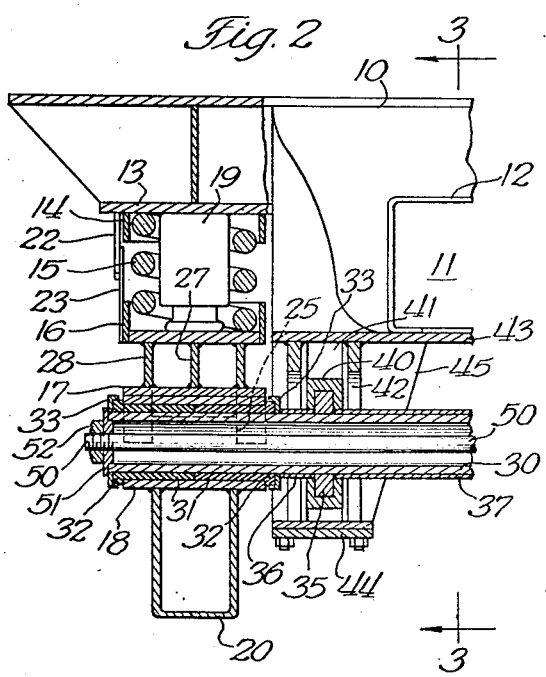
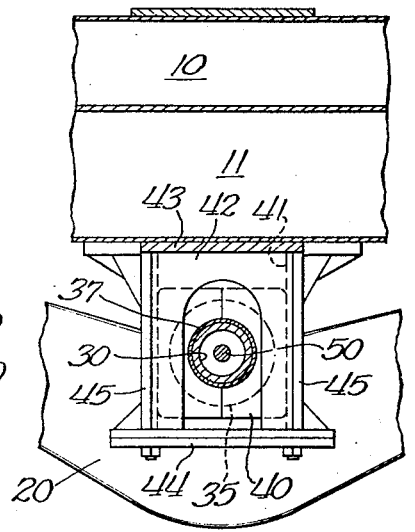
Alden W. Mackie
INVENTOR
BY Harold D. Cook
ATTORNEY Jan. 3, 1950      A. W. MACKIE      2,493,004
VEHICLE SUSPENSION
Filed Aug. 27, 1945      3 Sheets-Sheet 2
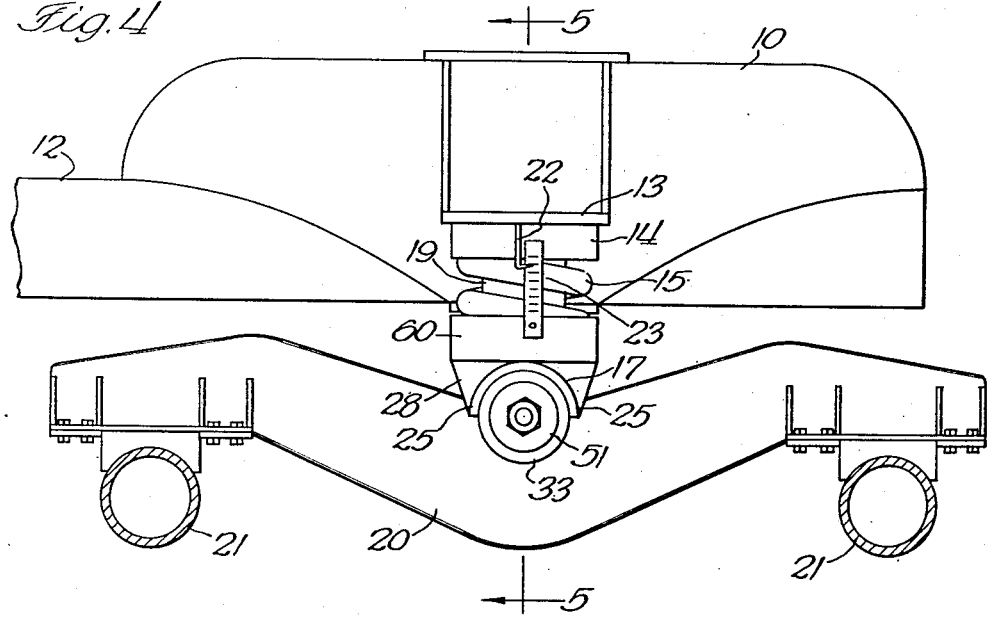
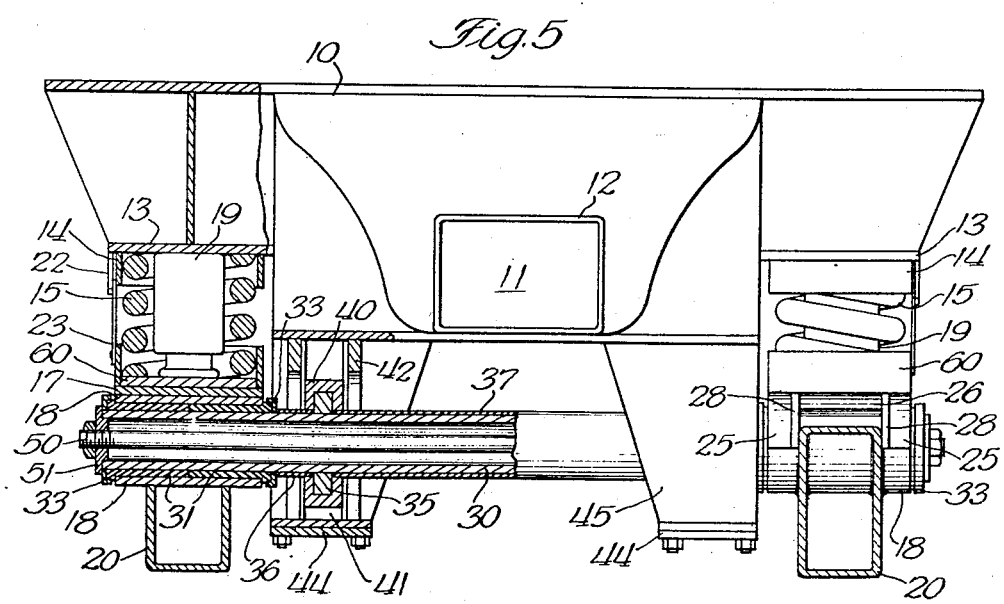
Alden W. Mackie
INVENTOR
BY Harold D. Cook
ATTORNEY Jan. 3, 1950     A. W. MACKIE     2,493,004
VEHICLE SUSPENSION
Filed Aug. 27, 1945     3 Sheets-Sheet 3
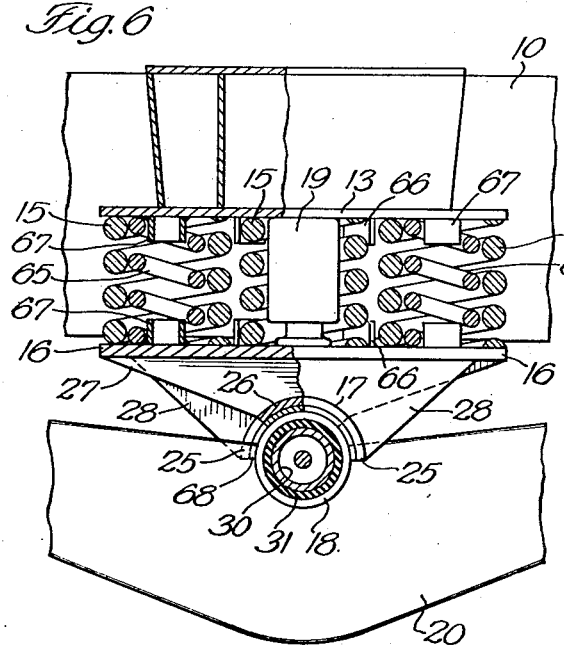
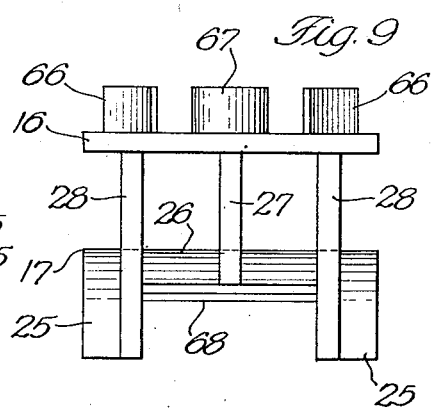
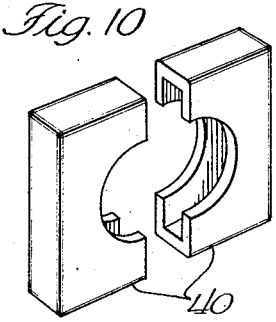
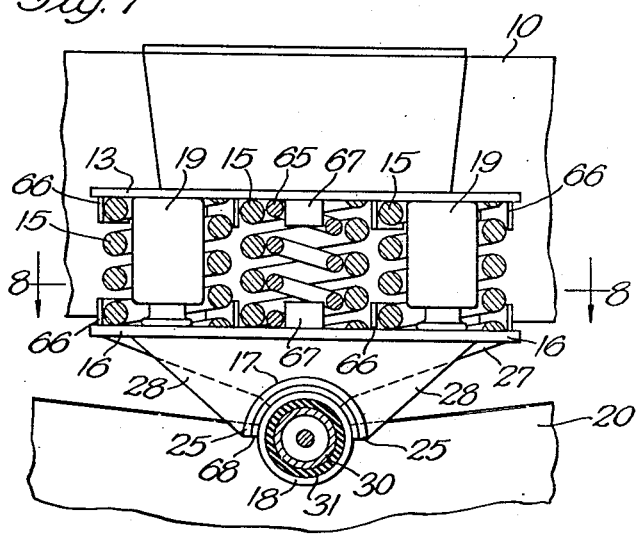
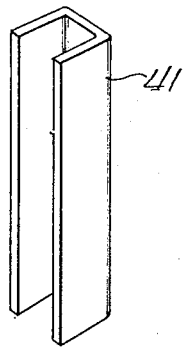
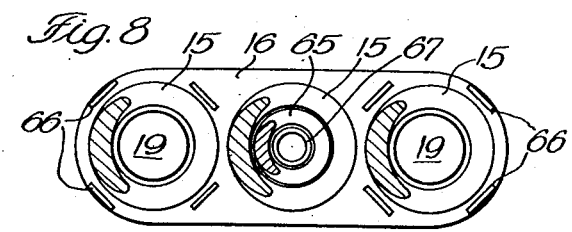
Alden W. Mackie
INVENTOR
BY Harold D. Cook
ATTORNEY Patented Jan. 3, 1950

2,493,004

UNITED STATES PATENT OFFICE 2,493,004

VEHICLE SUSPENSION

Alden W. Mackie, Portland, Oreg., assignor to Robert W. Pointer, Portland, Oreg.

Application August 27, 1945, Serial No. 612,900

20 Claims. (Cl. 280—104.5)

This invention relates to load carrying vehicles, and has particular reference to the running gear and spring suspension of such vehicles. More particularly, the invention relates to running gear and spring suspension having certain general features in common with the vehicle suspension disclosed and claimed in a copending application of Robert W. Pointer, Serial No. 632,550, filed Dec. 3, 1945, entitled Resilient suspension for vehicles.

In the application for Letters Patent referred to, the road wheel axles are mounted on walking beams provided with trunnions upon which the weight of the vehicle is brought to bear. Resting upon the trunnions are trunnion saddles carrying spring assemblies supporting the vehicle frame, each spring assembly comprising a plurality of coil springs having shock absorbers or snubbers associated therewith to control the spring action. A transverse trunnion shaft resiliently interconnects the walking beams on opposite sides of the vehicle to maintain each trunnion and walking beam in the proper position under the saddle, the trunnions being hollow and containing resilient rubber bushings into which the ends of the trunnion shaft are secured. Limited vertical movement of the trunnions in response to spring action is provided by guide boxes associated with the spring assemblies and having channels for slidably receiving guide blocks on the trunnion shaft.

The present invention embodies the above features in a number of novel structural modifications and adaptations for extra heavy duty vehicles such as logging trailers and the like carrying abnormally heavy loads concentrated on a transverse bunk or other load carrying member. The invention provides for the use of either one, two or three heavy coil springs on each trunnion saddle in accordance with the weight to be carried. In alternative constructions certain of these springs may contain shock absorber or snubber units therewithin, and other springs may contain auxiliary or secondary coil springs therewithin to give the desired spring rate. Other novel features of the present invention reside in the construction of the trunnion saddle, trunnion bushings, trunnion shaft slide block, and the manner in which these parts are assembled to facilitate disassembly and replacement with ordinary mechanic's tools. For purposes of illustration the invention is applied to a single beam dual axle type of suspension, but it is equally applicable to any axle carrying member having a trunnion support.

Additional features and details of construction are set forth more fully in connection with the detailed description which follows hereinafter, it being an object of the invention to embody all these features in an improved spring suspension for heavy duty vehicles having the qualities of simplicity and inexpensiveness of fabrication, superior riding qualities, and ruggedness and durability in use.

Other objects are to provide a vehicle suspension which is relatively light in weight, which is economical to maintain and repair, and which is extremely rigid in those parts necessary to maintain the proper alignment of the road wheels and prevent side sway while at the same time being sufficiently flexible and yielding to absorb road shock without transmitting it to the vehicle frame.

These and other objects are accomplished in the construction and arrangement of parts hereinafter described and illustrated in the accompanying drawings in connection with certain preferred embodiments. It is to be understood, however, that the invention is capable of many changes, and all such modifications which fall within the scope of the appended claims are included in the invention.

In the drawings:

Figure 1 is a view in side elevation of a logging trailer embodying the principles of the invention in a two-spring suspension;

Figure 2 is a transverse sectional view through the spring assembly and trunnion on one side of the trailer, taken on the line 2—2 of Figure 1;

Figure 3 is a view taken on the line 3—3 of Figure 2;

Figure 4 is a view in side elevation of a modification employing a one-spring suspension;

Figure 5 is a view, partly in rear elevation and partly in section, on the line 5—5 of Figure 4;

Figure 6 is a fragmentary view in side elevation with parts broken away showing a modification having three main springs containing two auxiliary springs and one shock absorber;

Figure 7 is a view similar to Figure 6, showing a further modification with three main springs containing one auxiliary spring and two shock absorbers;

Figure 8 is a sectional view taken on the line 8—8 of Figure 7;

Figure 9 is an end elevational view of the spring rider and trunnion saddle shown in Figures 7 and 8;

Figure 10 is a perspective view of a trunnion collar slide block; and

Figure 11 is a perspective view of one of the removable wear channels in the trunnion guide box.

In Figure 1 the salient features of the invention are embodied in a logging trailer having a two-spring suspension assembly associated with a walking beam having a pair of axles for road wheels. The frame of the vehicle, indicated by the numeral 10, is of hollow welded construction forming a water tank having a longitudinal tunnel 11 therethrough in continuation of the reach tube 12. Such a trailer is of the semi-trailer class, wherein a long reach pole from the tractor unit is received and clamped in the reach tube 12 and constitutes the only structural connection with the tractor. In use the reach pole may extend completely through the tunnel 11, the trailer being secured at the proper distance behind the tractor to provide the bunk spacing necessary to accommodate the length of the load being carried. In the drawings the bunks are omitted for clearness.

On either side of the frame 10 are rigidly braced overhanging spring supports 13 provided with short cylindrical spring shrouds 14 for seating the main coil springs 15. The lower ends of the springs support the weight of the vehicle upon a shrouded spring rider 16 having a trunnion saddle 17 resting upon the walking beam trunnion 18. Friction shock absorber units 19 are contained within the coil springs 15 to control the spring action. These units engage the spring support 13 and spring rider 16 and are preferably of the type disclosed and claimed in the patent to George E. Dath, No. 2,373,813, dated April 17, 1945.

The trunnion 18 preferably comprises a short length of steel tubing welded into the upper side of the walking beam 20 so as to leave almost 180 degrees of its upper surface exposed to form a bearing for the saddle 17 directly over the walking beam. Road wheel axles are indicated at 21 on the outer ends of the walking beam. As shown in Figure 2, the trunnion 18 overhangs the walking beam 20 on both sides, making 360 degrees of bearing surface available on the ends of the trunnion, whereas approximately only 180 degrees of bearing surface is available in the central part of the trunnion because of the contour of the upper edge of the walking beam. The saddle 17, therefore, has end portions 25 having an arcuate extent of 180 degrees bearing upon the ends of the trunnion on either side of the walking beam. Intermediate the end portions 25 is a central portion 26 having an arcuate extent of approximately 90 degrees bearing upon the central part of the trunnion directly above the walking beam to permit the beam to oscillate in the saddle. Thus the walking beam is confined between the end portions 25 to prevent the trunnion saddle from shifting along the trunnion. The spring rider 16 further includes a narrow central web 27 integral with the 90 degree sector of the saddle 17, and wider side webs 28 integral with the 180 degree sectors of the saddle. The shape of the trunnion saddle and the arrangement of the three webs are illustrated in greater detail in Figures 6 and 9 pertaining to a modification having a similarly shaped trunnion saddle.

A pointer 22 is attached to the spring support 13 so as to move over a scale 23 on the spring rider 16 to indicate by the deflection of the springs the weight of the load on the walking beams. The present suspension gives a weight indication of reasonable accuracy, which has not been possible heretofore with conventional leaf spring suspensions. This device enables the vehicle always to be loaded to capacity without the risk of violating prescribed weight limits on public highways.

Lateral shifting of the walking beams in either direction is prevented by a transverse trunnion shaft 30 resiliently connecting the trunnions on opposite sides of the vehicle. Means are provided for guiding the trunnion shaft and its associated trunnions and walking beams for limited vertical movement to accommodate the action of the springs while at the same time preventing movement either transversely or longitudinally of the vehicle frame. Each end of the trunnion shaft 30 passes through one of the hollow tubular trunnions 18 within resilient rubber bushings 31 in the trunnion. Bushings 31 abut in the center of the trunnion and have outer flanges 32 overlapping the ends of the trunnion, the flanged ends of the bushings being in turn confined between cup washers 33, as shown.

Just inwardly of the trunnion on each end of the trunnion shaft a loose collar 35 is confined and positioned between two loose spacing tubes 36 and 37, the latter extending between the two collars on the opposite ends of the trunnion shaft. The two halves of a slide block 40 enclose the collar 35 for sliding movement in removable vertical channel members 41 in a guide box 42 welded or otherwise secured to the bottom tank plate 43 of the frame 10. The slide blocks 40 and the channel members 41 are made of dissimilar metals which wear well together, such as steel and bronze, respectively, and are shown in greater detail in Figures 10 and 11. These elements are retained in assembled relation by a bottom plate 44 on the guide box which also serves to limit the spring travel. The guide box is braced by a plurality of gussets 45 to provide rigidity against side thrust.

The bushings 31 and the collar 35 are maintained in their correct positions on each end of the trunnion shaft by means of a tie rod 50 having caps 51 and nuts 52 which may be tightened at each end thereof sufficiently to compress the bushings slightly. The flanges 32 on the bushings prevent shifting of the trunnions on the trunnion shaft, and the depending end portions 25 on the saddles in turn prevent the saddles from shifting on the trunnions. When it is necessary to replace the bushings 31, the slide blocks 40 or the channel members 41, these parts may be removed by unscrewing the nuts 52 from the ends of the tie rod, removing the bottom plates 44 from the guide boxes and jacking up the frame 10.

Thus the trunnion shaft 30 carries no weight, its sole function being to maintain the walking beams in proper position and alignment on opposite sides of the vehicle while allowing for the free play of the spring action and rocking motion of the walking beam under the trunnion saddle. The guide boxes 42 provide adequate rigid means for preventing side movement or side sway under all conditions without requiring heavy and complicated parts. In the present logging trailer the spring supports 13 and the guide boxes 42 are made integral parts of the truck frame 10 by welding, but it is understood that the invention is not limited to this particular construction.

The modification shown in Figures 4 and 5 embodies the features of novelty hereinabove described in a spring assembly comprising a single helical spring and shock absorber. In this embodiment the spring support 13 carries a single spring shroud 14. A shock absorber or snubber 19 is contained within the spring 15, and the spring and shock absorber unit are seated in a spring rider 60 of slightly modified construction since it need be only half as long as the spring rider 16 in Figure 1. The saddle 17, however, is identical with the saddle 17 in Figure 1, having a central portion 26 of approximately 90 degrees arcuate extent immediately above the walking beam, and end portions 25 of approximately 180 degrees arcuate extent lying on either side of the walking beam. Because of the shorter length of the spring rider 60 it may rest on and be attached directly to the saddle 17 as shown in Figure 5, the central web being omitted and the end webs 28 taking the form of four small gussets which do not extend continuously across the top of the saddle. The trunnion shaft, guide box and trunnion bushings are constructed and arranged the same as in Figure 1, whereby the trunnion shaft is effective to prevent lateral displacement of the walking beams, and to prevent shifting of the trunnion saddles on the trunnions. Like parts are identified by the same reference numerals throughout the drawings.

In Figure 6 three main springs 15 are arranged over the walking beam in a longitudinal vertical plane. The two outer springs 15 contain auxiliary inner springs 65, and the central spring 15 contains a shock absorber unit 19. In lieu of spring cups or shrouds, spring guides 66 are provided on the base plate 13 and spring rider plate 16 to confine and position the ends of the central spring. The end spring combinations are held in place by tubular spring centers 67 on the two plates. The shape of the saddle 17 and the arrangement of the three webs 27 and 28 correspond to the embodiment of Figure 1, but the proportions are changed to accommodate the added length of the spring rider plate, and the saddle is lined with a bronze bushing 68. The trunnion shaft and guide box are constructed and arranged as in Figure 1.

In Figure 7 the spring combinations are varied to provide two shock absorber units and a single inner spring to illustrate the adaptability of the three spring arrangement to different vehicle requirements. The positions of the parts are shown in plan view in Figure 8, which view is also significant to Figure 6 inasmuch as Figures 6 and 7 differ only by a transposition of the spring combinations.

Figure 9 illustrates the integral spring rider plate and trunnion saddle of Figures 6 and 7, both appearing the same in end elevation. Except for the spring guides 66, spring centers 67, and bronze liner 68, Figure 9 illustrates also the spring rider plate and saddle of Figure 1.

The principal wearing parts in the present suspension system comprise the removable trunnion shaft slide blocks 40 and guide box channel elements 41 shown in Figures 10 and 11. These parts are identical in all modifications of the invention.

While the invention is not limited to logging trailers, it is pointed out that it is especially well suited for such vehicles which are rather unique in that they ordinarily never travel without a full load. When the logs are unloaded the trailer is unhitched and pulled up on the tractor unit for the return trip. The spring requirements are, therefore, quite fixed in comparison with the variable loading which must be accommodated by the usual vehicle spring suspension systems. The present spring suspension, when applied to a logging trailer, is not concerned with problems arising out of high speed operation with no load as in the above mentioned copending application, and the structural differences between the two inventions arise in part out of the different functional requirements. Figures 2 and 5 are accordingly drawn to show the trunnion shaft in an intermediate position in the guide box, assuming the vehicle to be carrying a considerable load, illustrating the approximate normal positions of the parts in operation on the road.

Having now described my invention and in what manner the same may be used, what I claim as new and desire to protect by Letters Patent is:

1. In a vehicle suspension, a pair of walking beams, one on each side of the vehicle, a trunnion on each of said walking beams, spring assemblies supporting said vehicle on said trunnions, smooth cylindrical uniform diameter through bores in said trunnions, resilient bushings in said trunnions extending outwardly beyond the outward ends thereof, a transverse trunnion shaft extending through said bushings and carrying no weight, and means to secure said bushings in a fixed position on said shaft, said trunnions carrying all the weight imposed on said walking beams independently of said guide shaft.

2. In a vehicle suspension, a pair of walking beams, one on each side of the vehicle, a trunnion on each of said walking beams, a smooth cylindrical uniform diameter through bore in each trunnion, spring assemblies supporting said vehicle on said trunnions, resilient bushings in said trunnions extending outwardly beyond the ends thereof, a transverse trunnion shaft extending through said bushings, and means on said shaft to clamp and compress said bushings longitudinally to bind said bushings against said shaft and said trunnions.

3. In a vehicle suspension, a pair of walking beams, one on each side of the vehicle, a smooth bore cylindrical trunnion on each of said walking beams, spring assemblies supporting said vehicle on said trunnions, resilient bushings within said trunnions and extending outwardly beyond the ends thereof, a transverse trunnion shaft extending through said bushings, cup washers on said shaft engaging the ends of said bushings, and means on said shaft to clamp said washers together longitudinally of said shaft to compress said bushings into binding engagement with said shaft and said trunnions to maintain said trunnions in fixed longitudinal positions on said shaft.

4. In a vehicle suspension, a pair of walking beams, one on each side of the vehicle, a trunnion on each of said walking beams, a smooth cylindrical uniform diameter through bore in each trunnion, spring assemblies for supporting said vehicle on said trunnions, resilient bushings in said trunnions, flanges on said bushings overlying the ends of said trunnions, a transverse trunnion shaft extending through said bushings, washers on said shaft engaging said flanges, and means on said shaft for clamping said washers together to longitudinally compress said bushings into binding engagement with said shaft and said trunnions to maintain said trunnions in fixed longitudinal positions on said shaft.

5. In a vehicle suspension, a pair of walking beams, one on each side of the vehicle, a tubular trunnion on each of said walking beams, spring assemblies supporting said vehicle on said trunnions, a transverse trunnion shaft resiliently interconnecting said trunnions, collars on said trunnion shaft adjacent said trunnions, removable spacing means on said shaft between said collars, slide blocks on said collars, and guide boxes on said vehicle slidably receiving said slide blocks for vertical movement therein.

6. In a vehicle suspension, a pair of walking beams, one on each side of the vehicle, tubular trunnions on said walking beams, spring assemblies supporting the vehicle on said trunnions, a transverse trunnion shaft resiliently interconnecting the trunnions, collars on said shaft adjacent said trunnions, removable slide blocks on said collars, vertical guide boxes on said vehicle, and removable guide channels in said guide boxes slidably receiving said slide blocks.

7. In a vehicle suspension, a pair of walking beams, one on each side of the vehicle, a tubular trunnion on each of said walking beams, spring assemblies supporting the vehicle on said trunnions, resilient bushings in said trunnions, vertical guide boxes on said vehicle adjacent said trunnions, a transverse trunnion shaft extending through said guide boxes and having its ends received in said bushings, collars on said shaft for guiding said shaft for vertical movement in said guide boxes, a spacer tube on said shaft between said collars, spacer tubes between said collars and said bushings, and means on the ends of said shaft for clamping said bushings, said spacer tubes and said collars together longitudinally of the shaft.

8. In a vehicle suspension, a pair of walking beams, one on each side of the vehicle, a tubular trunnion on each of said walking beams, spring assemblies supporting the vehicle on said trunnions, resilient bushings in said trunnions, vertical guide boxes on said vehicle adjacent said trunnions, a transverse trunnion shaft extending through said guide boxes and having its ends received in said bushings, collars on said shaft for guiding said shaft for vertical movement in said guide boxes, a spacer tube on said shaft between said collars, spacer tubes between said collars and said bushings, and means on the ends of said shaft for clamping said bushings, said spacer tubes and said collars together longitudinally of the shaft under compression of said bushings, all of said elements being loose on said shaft and freely removable therefrom upon release of said clamping means.

9. In a vehicle suspension, a pair of walking beams, one on each side of the vehicle, a tubular trunnion on each of said walking beams, spring assemblies supporting the vehicle on said trunnions, resilient bushings in said trunnions, vertical guide boxes on said vehicle adjacent said trunnions, a transverse trunnion shaft extending through said guide boxes and having its ends received in said bushings, collars on said shaft for guiding said shaft for vertical movement in said guide boxes, a spacer tube on said shaft between said collars, spacer tubes between said collars and said bushings, and a tie rod extending through said shaft for clamping said bushings, said spacer tubes and said collars together longitudinally of the shaft.

10. In a vehicle suspension, a pair of walking beams, one on each side of the vehicle, an overhanging trunnion on each of said walking beams, a transverse trunnion shaft interconnecting said trunnions, trunnion saddles on said trunnions, and spring assemblies for supporting said vehicle on said saddles, said saddles having end portions extending on opposite sides of said walking beams and confining said walking beams therebetween to prevent said saddles from shifting on said trunnions, and said saddles having continuous bearing on said trunnions across the width of said beams and on the overhanging portions of the trunnions.

11. In a vehicle walking beam suspension, a spring rider and trunnion saddle comprising an arcuate saddle bearing having end portions of greater arcuate extent than the central portion thereof to straddle a walking beam, a horizontal spring supporting plate, and a plurality of vertical webs integrally interconnecting said spring supporting plate and said arcuate bearing.

12. In a vehicle suspension, a pair of walking beams, one on each side of the vehicle, a trunnion on each of said walking beams having a continuous load supporting surface extending across the width of said beam, a transverse trunnion shaft resiliently interconnecting said trunnions, a spring rider and trunnion saddle bearing on each of said trunnions, a single helical spring on each of said riders supporting said vehicle, and shock absorbers in said springs.

13. In a vehicle suspension, a pair of walking beams, one on each side of the vehicle, a trunnion on each of said walking beams having a continuous load supporting surface extending across the width of said beam, a transverse trunnion shaft resiliently interconnecting said trunnions, a spring rider and trunnion saddle bearing on each of said trunnions, a pair of helical springs seated on said rider and supporting said vehicle, and a shock absorber within each of said springs.

14. In a vehicle suspension, a pair of walking beams, one on each side of the vehicle, a trunnion on each of said walking beams having a continuous load supporting surface extending across the width of said beam, a transverse trunnion shaft resiliently interconnecting said trunnions, a spring rider and trunnion saddle bearing on each of said trunnions, a triple coil spring assembly supporting said vehicle on said spring rider, a shock absorber in one of said springs, and an inner spring in another of said springs.

15. In a vehicle suspension unit, a spring rider and trunnion saddle, a triple coil spring assembly on said spring rider, a friction shock absorber in at least one of said springs, an inner spring in at least one other of said springs, said spring rider comprising a spring supporting plate, said trunnion saddle comprising an arcuate saddle bearing, and said unit including a plurality of vertical webs integrally connecting said supporting plate and said arcuate saddle earing.

16. In a vehicle suspension, a water tank constituting a vehicle frame, a walking beam trunnion having a continuous bearing surface extending across the width of said beam, a saddle bearing on said trunnion, a coil spring and shock absorber assembly supporting said frame on said saddle bearing, and a transverse trunnion guide shaft having its ends resiliently mounted in said trunnions on opposite sides of the vehicle.

17. In a vehicle suspension, a water tank constituting a vehicle frame, overhanging spring base members on opposite sides of said tank, a pair of walking beams vertically beneath said members, trunnions extending across said beams, spring assemblies supporting said members on said trunnions, a transverse trunnion guide shaft having its ends resiliently mounted in said trunnions, and a vertical guide box on the bottom of said tank adjacent each of said spring base members receiving said guide shaft for vertical movement therein.

18. In a vehicle suspension, a vehicle frame, a walking beam carrying an axle at each end thereof, a tubular trunnion on said walking beam, a saddle bearing and rider on said trunnion, a resilient member supporting said frame on said rider, a resilient bushing in said trunnion, and a transverse trunnion guide shaft secured in said bushing and carrying no weight, said trunnion constituting the only weight carrying member between said saddle bearing and said walking beam to support said frame independently of said guide shaft.

19. In a vehicle suspension, a water tank constituting a vehicle frame, overhanging spring base members on opposite sides of said tank, a vertical guide box on the bottom of said tank adjacent each of said spring base members, a pair of walking beams, trunnions on said walking beams, spring rider trunnion saddles on said trunnions, spring and shock absorber assemblies on said spring rider trunnion saddles supporting said frame on said spring base members, a transverse trunnion guide shaft resiliently interconnecting said trunnions on opposite sides of the vehicle and carrying no load, and means on said guide shaft slidable in said guide boxes to maintain said walking beams in position and alignment while permitting the beams to rock in said saddles and move vertically under spring action.

20. In a vehicle suspension, a pair of walking beams, one on each side of the vehicle, a pair of axles carried by said walking beams, a trunnion extending across each of said walking beams, a pair of resilient assemblies supporting said vehicle on said trunnions across the width of said beams, and a transverse trunnion guide shaft having its ends resiliently mounted in said trunnion.

ALDEN W. MACKIE.

REFERENCES CITED

The following references are of record in the file of this patent:

UNITED STATES PATENTS

| Number | Name | Date |
|---|---|---|
| 749,287 | Gibbs | Jan. 12, 1904 |
| 1,606,463 | Barney | Nov. 9, 1926 |
| 1,811,837 | Alden | June 30, 1931 |
| 1,985,414 | Judd | Dec. 25, 1934 |
| 2,037,022 | Holby | Apr. 14, 1936 |
| 2,096,530 | Alden | Oct. 19, 1937 |
| 2,103,381 | Perkins et al. | Dec. 28, 1937 |
| 2,116,189 | Clark | May 3, 1938 |
| 2,135,820 | Kuchar | Nov. 8, 1938 |
| 2,206,752 | Price | July 2, 1940 |
| 2,250,134 | Pointer | July 22, 1941 |
| 2,365,406 | Gilchrist et al. | Dec. 19, 1944 |
| 2,369,890 | George | Feb. 20, 1945 |

FOREIGN PATENTS

| Number | Country | Date |
|---|---|---|
| 40,376 | France | Mar. 15, 1932 |